(12) United States Patent
Matres et al.

(10) Patent No.: US 10,488,593 B2
(45) Date of Patent: Nov. 26, 2019

(54) POLARIZATION DIVERSE DISTRIBUTED PERTURBATION RECEIVERS

(71) Applicant: Hewlett Packard Enterprise Development LP, Houston, TX (US)

(72) Inventors: Joaquin Matres, Palo Alto, CA (US); Wayne Victor Sorin, Mountain View, CA (US); Stanley Cheung, Palo Alto, CA (US); Sagi Varghese Mathai, Sunnyvale, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/092,110

(22) PCT Filed: Apr. 8, 2016

(86) PCT No.: PCT/US2016/026581
§ 371 (c)(1),
(2) Date: Oct. 8, 2018

(87) PCT Pub. No.: WO2017/176281
PCT Pub. Date: Oct. 12, 2017

(65) Prior Publication Data
US 2019/0154920 A1 May 23, 2019

(51) Int. Cl.
*G02B 6/27* (2006.01)
*G02B 6/34* (2006.01)
(Continued)

(52) U.S. Cl.
CPC ....... *G02B 6/2773* (2013.01); *G02B 6/02076* (2013.01); *G02B 6/126* (2013.01);
(Continued)

(58) Field of Classification Search
None
See application file for complete search history.

(56) References Cited

U.S. PATENT DOCUMENTS 5,502,783 A 3/1996 Wu
5,809,184 A 9/1998 Doerr et al.
(Continued)

FOREIGN PATENT DOCUMENTS

EP 1359444 11/2003

OTHER PUBLICATIONS

Evans, D.R. et al,; "Contra-directional Two-beam Coupling by Use of a Single Input Beam in an Iron-doped Lithium Niobate Multimode Fiber", vol. 41, Issue 32, 2002, 3 pages.
(Continued)

*Primary Examiner* — Michelle R Connelly
(74) *Attorney, Agent, or Firm* — Hewlett Packard Enterprise Patent Department (57) ABSTRACT

In the examples provided herein, a polarization diversity receiver system includes a loop waveguide, and a two-dimensional grating coupler formed on the loop waveguide to couple light impinging on the grating coupler having a first polarization into the loop waveguide in a first direction, and to couple light having a second polarization orthogonal to the first polarization into the loop waveguide in a second direction. The system also includes a first output waveguide positioned near the loop waveguide in a first coupling region, a first distributed perturbation having a first resonant wavelength in the first coupling region to cause coupling of light at the first resonant wavelength between the loop waveguide and the first output waveguide, and a first photodetector to detect light propagating out of a first end and a second end of the first output waveguide.

15 Claims, 6 Drawing Sheets

(51) Int. Cl.
*G02B 6/12* (2006.01)
*H04B 10/67* (2013.01)
*H04B 10/2569* (2013.01)
*G02B 6/126* (2006.01)
*G02B 6/02* (2006.01)
*G02B 6/293* (2006.01)

(52) U.S. Cl.
CPC ......... *G02B 6/293* (2013.01); *G02B 6/29338* (2013.01); *H04B 10/2569* (2013.01); *H04B 10/67* (2013.01); *G02B 2006/12147* (2013.01)

(56) References Cited

U.S. PATENT DOCUMENTS

| | | | |
|---|---|---|---|
| 7,292,752 B2 | 11/2007 | Faccio et al. | |
| 7,298,945 B2 | 11/2007 | Gunn, III et al. | |
| 2010/0322555 A1* | 12/2010 | Vermeulen | G02B 6/12007 385/28 |
| 2011/0008001 A1* | 1/2011 | Doerr | G02B 6/12004 385/37 |
| 2012/0045173 A1 | 2/2012 | Doerr | |
| 2012/0296604 A1* | 11/2012 | Bienstman | C10J 3/463 702/172 |
| 2013/0188971 A1 | 7/2013 | Painchaud | |
| 2013/0209020 A1* | 8/2013 | Doerr | G02F 1/011 385/2 |
| 2015/0260914 A1 | 9/2015 | Zheng et al. | |
| 2016/0294478 A1* | 10/2016 | Mizrahi | H04J 14/0282 |
| 2018/0275348 A1* | 9/2018 | Matres | G02B 6/29302 |

OTHER PUBLICATIONS

International Searching Authority, International Search Report and Written Opinion for PCT Application PCT/US2016/026581, dated Dec. 12, 2016, 9 pages.

* cited by examiner

POLARIZATION DIVERSE DISTRIBUTED PERTURBATION RECEIVERS

BACKGROUND

An optical Bragg grating coupler is an optical device that has a periodic refractive index variation of the refractive index. For a band of wavelengths around a central wavelength $\lambda_R$, where $\lambda_R$ satisfies a phase-matching condition, $\lambda_R = \Lambda(n_1 + n_2)$, and where $\Lambda$ is the pitch of the grating, and $n_1$, $n_2$ are the effective refractive indices of the modes in the grating, the band of wavelengths incident upon the Bragg grating coupler are reflected. Wavelengths outside the band of wavelengths continue to propagate in the original direction.

BRIEF DESCRIPTION OF THE DRAWINGS

The accompanying drawings illustrate various examples of the principles described below. The examples and drawings are illustrative rather than limiting.

DETAILED DESCRIPTION

Light propagating in an optical fiber may have a random state of polarization that may be decomposed into two orthogonal linearly polarized components. As described below, light from the optical fiber may be received by a photonics integrated circuit, and through the use of a distributed perturbation, a single photodetector may be used to detect light having both orthogonal polarizations.

Figure 1:
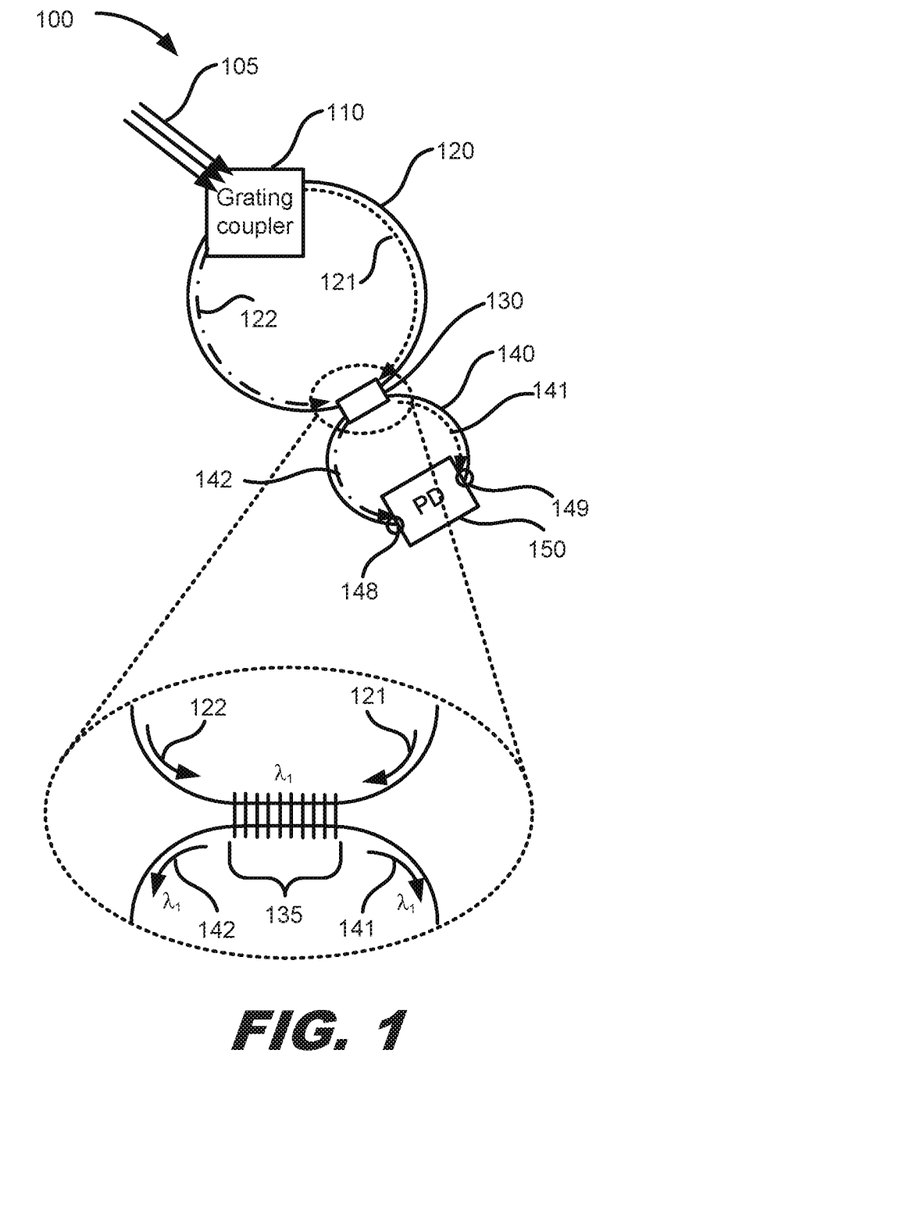
FIG. 1 depicts a diagram of an example receiver system that includes a two-dimensional grating coupler, a loop waveguide, an output waveguide, a distributed perturbation, and a photodetector.

FIG. 1 depicts a diagram of an example polarization diversity receiver system 100 that includes a two-dimensional grating coupler 110, a loop waveguide 120, a first output waveguide 140, a first distributed perturbation 130, and a first photodetector 150.

Light 105 having a random state of polarization may impinge upon the two-dimensional grating coupler 110. In some implementations, the light may come from a single-mode optical fiber (not shown) that can support two orthogonal linearly polarized modes such that the light 105 is in an elliptical state of polarization. The optical fiber may be physically in contact or in close proximity with the two-dimensional grating coupler 110. The optical fiber may be oriented perpendicular or at an angle to the two-dimensional grating coupler 110.

The two-dimensional grating coupler 110 may be an optical grating structure, such as a diffraction grating, that has periodic and/or non-periodic structural components, such as posts or holes of any shape; lines; or grooves. The two-dimensional grating coupler 110 may be a two-dimensional grating that has periodic and/or non-periodic structural components extending in two dimensions.

The two-dimensional grating coupler 110 may be formed on a loop waveguide 120, for example, the loop waveguide 120 may be integrated with a photonic integrated circuit. A top-down view of the loop waveguide 120 may have any shape, such as a circle, racetrack, ellipse, or any other closed configuration.

When light 105 impinges upon the two-dimensional grating coupler 110, light having a first polarization may couple into the loop waveguide 120 in a first direction, for example, in a clockwise direction 121, and light having a second polarization orthogonal to the first polarization may couple into the loop waveguide 120 in a second direction, for example, in a counter-clockwise direction 122. Once the orthogonal polarizations from the fiber are coupled into the loop waveguide 120, the clockwise 121 and counter-clockwise 122 propagating light have substantially the same polarization. For example, the clockwise 121 and counter-clockwise 122 propagating light may have transverse electric (TE) polarization.

The first output waveguide 140 may be positioned near the loop waveguide 120 in a first coupling region 130. The first output waveguide 140 is a waveguide, for example, integrated with the photonic integrated circuit of the loop waveguide 120. A first distributed perturbation 135, such as a Bragg grating, having a first resonant wavelength $\lambda_1$ may be formed in the first coupling region 130 to cause coupling of light at the first resonant wavelength $\lambda_1$ between the loop waveguide 120 and the first output waveguide 140. The first distributed perturbation 135 may be a periodic variation in the effective refractive index, where the first resonant wavelength $\lambda_1$ satisfies a phase-matching condition of the Bragg grating. The first distributed perturbation 135 may be formed on the loop waveguide 120 and the first output waveguide 140 or between the loop waveguide 120 and the first output waveguide 140.

When light propagating in the clockwise direction 121 in the loop waveguide 120 encounters the first distributed perturbation 135, light at the first resonant wavelength $\lambda_1$ is reflected and coupled into the first output waveguide 140 to propagate in clockwise direction 141. The rest of the light propagating in clockwise direction 121 in the loop waveguide 120 that is not at the first resonant wavelength $\lambda_1$ continues propagating in the loop waveguide 120. Similarly, when light propagating in the counter-clockwise direction 122 in the loop waveguide 120 encounters the first distributed perturbation 135, light at the first resonant wavelength $\lambda_1$ is reflected and coupled into the first output waveguide 140 to propagate in counter-clockwise direction 142. The rest of the light propagating in counter-clockwise direction 122 in the loop waveguide 120 that is not at the first resonant wavelength $\lambda_1$ continues propagating in the loop waveguide 120.

A first photodetector 150 detects light propagating in clockwise direction 141 and exiting the output waveguide 140 at a first end 149 and light propagating in counter-clockwise direction 142 and exiting the output waveguide 140 at a second end 148. Thus, a single photodetector 150 may be used to detect both orthogonal polarizations of light 105. Alternatively, the first end 149 and second end 148 of the first output waveguide 140 may be located on the same side of the photodetector 150.

The first distributed perturbation 135 may perform the function of a bandpass filer where a band of wavelengths around the first resonant wavelength $\lambda_1$ satisfy the phase-matching condition and cause coupling of light between the loop waveguide 120 and the output waveguide 140. Thus, the photodetector 150 may be a broadband detector, however, because the first distributed perturbation 135 operates as a bandpass filter, coupling just the light at the resonant wavelength $\lambda_1$, where the photodetector 150 output corresponds to the optical power impinging on the two-dimensional grating coupler 110 at the band of wavelengths around the first resonant wavelength $\lambda_1$.

In some implementations, the first distributed perturbation 135 may be a uniformly periodic modulation of the refractive index across the entire perturbation. In other implementations, the first distributed perturbation 135 may be an apodized modulation, such as an apodized Bragg grating where the strength of the modulation of the refractive indices of the grating increases from zero at one end of the perturbation to a maximum and then decreases back down to zero at the other end of the perturbation.

In the example of FIG. 1, there is a single first coupling region 130 that may be positioned symmetrically with respect to the two-dimensional grating coupler 110 such that there is no optical delay difference between light propagating clockwise 121 and light propagating counter clockwise 122 in the loop waveguide 120 when the first coupling region 130 is reached. Further, the photodiode 150 may also be positioned symmetrically with respect to the first coupling region 130 such that there is no optical delay difference between light propagating clockwise 141 and light propagating counter clockwise 142 in the first output waveguide 140. Thus, there is no optical delay difference between light detected by photodiode 150 exiting the first end 149 and the second end 148 of the first output waveguide 140.

The resonant wavelength of the first distributed perturbation 135 may be tuned over a range of wavelengths by inducing a change in the refractive index across the first distributed perturbation 135, for example, by injecting carriers or changing the temperature of a portion or all of the first distributed perturbation 135. By adjusting the resonant wavelength of the first distributed perturbation 135, the photodetector 150 detects the optical power of the light at the selected resonant wavelength impinging on the grating coupler 110.

Figure 2:
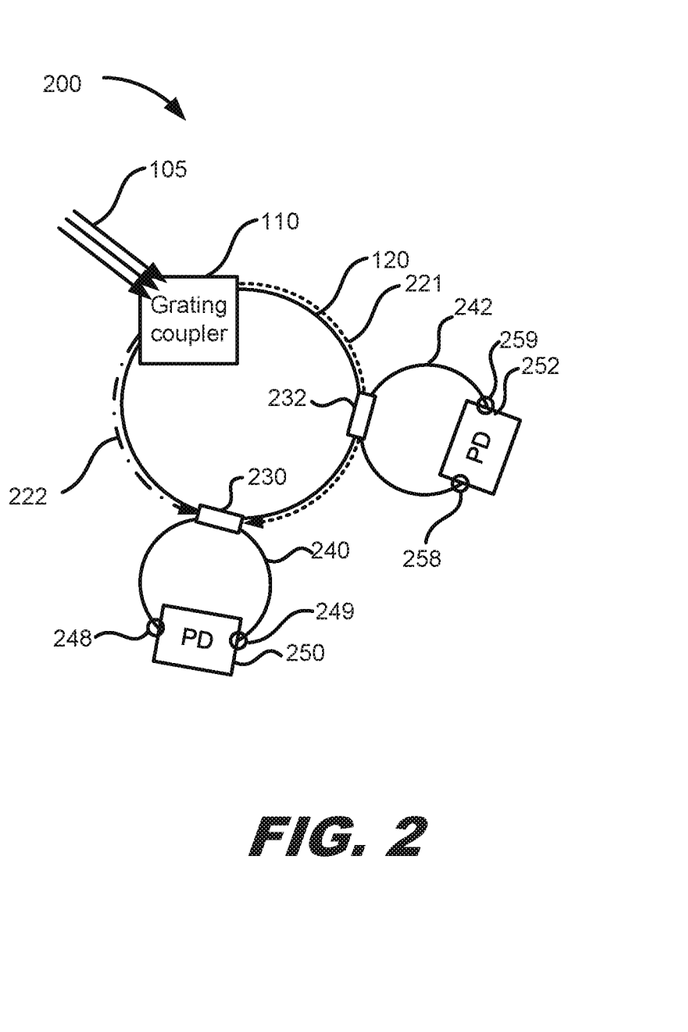
FIG. 2 depicts a diagram of an example receiver system that includes a two-dimensional grating coupler and a loop waveguide, with two asymmetrically positioned distributed perturbations and output waveguides.

FIG. 2 depicts a diagram of an example receiver system 200 that includes a two-dimensional grating coupler 110, a loop waveguide 120, and two asymmetrically positioned coupling regions 230, 232, each with a corresponding output waveguide and photodetector. Two output waveguides 240, 242, and two photodetectors 250, 252 are used in this configuration.

A first output waveguide 240 is positioned near the loop waveguide 120 in a first coupling region 230. A first distributed perturbation, such as a Bragg grating, having a first resonant wavelength $\lambda_1$ may be in the first coupling region 230 to cause coupling of light at the first resonant wavelength $\lambda_1$ between the loop waveguide 120 and the first output waveguide 240.

Similarly, a second output waveguide 242 is positioned near the loop waveguide 120 in a second coupling region 232. A second distributed perturbation, such as a Bragg grating, having a second resonant wavelength 2 may be in the second coupling region 232 to cause coupling of light at the second resonant wavelength $\lambda_2$ between the loop waveguide 120 and the second output waveguide 242. The second resonant wavelength $\lambda_2$ is different from the first resonant wavelength $\lambda_1$.

When light propagating in clockwise direction 221 in the loop waveguide 120 encounters the second distributed perturbation in the second coupling region 232, light at the second resonant wavelength $\lambda_2$ is reflected and coupled into the second output waveguide 242 to propagate in a clockwise direction. The rest of the light propagating in clockwise direction 221 in the loop waveguide 120 that is not at the second resonant wavelength $\lambda_2$ continues propagating in the loop waveguide 120. When light propagating in clockwise direction 221 in the loop waveguide 120 encounters the first distributed perturbation in the first coupling region 230, light at the first resonant wavelength $\lambda_1$ is reflected and coupled into the first output waveguide 240 to propagate in a clockwise direction. The rest of the light propagating in clockwise direction 221 in the loop waveguide 120 that is not at the first resonant wavelength $\lambda_1$ or the second resonant wavelength $\lambda_2$ continues propagating in the loop waveguide 120.

Similarly, when light propagating in counter-clockwise direction 222 in the loop waveguide 120 encounters the first distributed perturbation in the first coupling region 230, light at the first resonant wavelength $\lambda_1$ is reflected and coupled into the first output waveguide 240 to propagate in a counter-clockwise direction. The rest of the light propagating in counter-clockwise direction 222 in the loop waveguide 120 that is not at the first resonant wavelength $\lambda_1$ continues propagating in the loop waveguide 120. When light propagating in counter-clockwise direction 222 in the loop waveguide 120 encounters the second distributed perturbation in the second coupling region 232, light at the second resonant wavelength $\lambda_2$ is reflected and coupled into the second output waveguide 242 to propagate in a counter-clockwise direction. The rest of the light propagating in counter-clockwise direction 222 in the loop waveguide that is not at the first resonant wavelength $\lambda_1$ or the second resonant wavelength $\lambda_2$ continues propagating in the loop waveguide 120.

A first photodetector 250 detects light propagating in the clockwise direction and exiting the first output waveguide 240 at a first end 249 and light propagating in the counter-clockwise direction and exiting the first output waveguide 240 at a second end 248. Thus, a single photodetector 250 may be used to detect both orthogonal polarizations of light 105 at the first resonant wavelength $\lambda_1$. Alternatively, the first end 249 and second end 248 of the first output waveguide 240 may be located on the same side of the photodetector 250.

A second photodetector 252 detects light propagating in the clockwise direction and exiting the second output waveguide 242 at a first end 259 and light propagating in the counter-clockwise direction and exiting the second output waveguide 242 at a second end 258. Thus, a single photodetector 252 may be used to detect both orthogonal polarizations of light 105 at the second resonant wavelength different from the first resonant wavelength $\lambda_1$.

Depending on the position of the first coupling region 230 relative to the two-dimensional grating coupler 110 and the position of the first photodetector 250, there may be a difference in optical delay between the path traveled by light 221 coupled clockwise and light 222 coupled counter-clockwise into the loop waveguide 120 and is subsequently coupled into the first output waveguide 240 before reaching the first photodetector 250. Similarly, there may be a difference in optical delay between the path traveled by light 221 coupled clockwise and light 222 coupled counter-clockwise into the loop waveguide 120 and is subsequently coupled into the second output waveguide 242 before reaching the second photodetector 252. The optical delay may be compensated for as described below.

Figure 3:
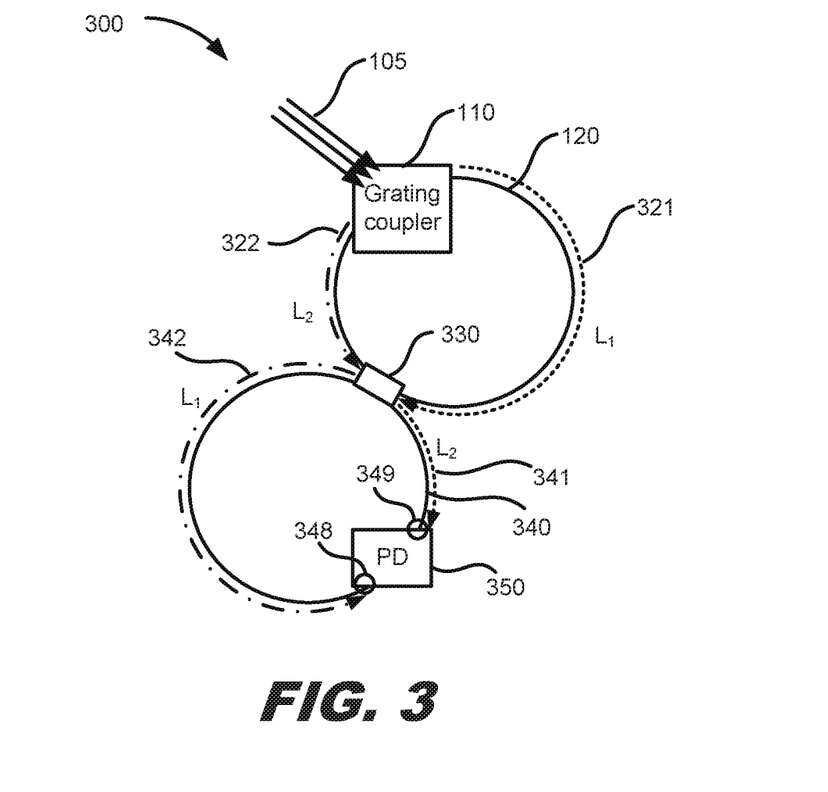
FIG. 3 depicts a diagram of an example receiver system that includes a two-dimensional grating coupler, a loop waveguide, an asymmetrically positioned distributed perturbation and output waveguide, and a single photodetector.

FIG. 3 depicts a diagram of an example receiver system 300 that includes a two-dimensional grating coupler 110, a loop waveguide 120, a coupling region 330 asymmetrically positioned relative to the two-dimensional grating coupler 110, an output waveguide 340; and a single photodetector 350.

The output waveguide 340 is positioned near the loop waveguide 120 in the asymmetrically positioned coupling region 330. A distributed perturbation, such as a Bragg grating, having a resonant wavelength $\lambda_1$ may be in the coupling region 330 to cause coupling of light at the resonant wavelength $\lambda_1$ between the loop waveguide 120 and the output waveguide 340. The position of the coupling region 330 is asymmetrically positioned with respect to the two-dimensional grating coupler 110 such that light impinging on the two-dimensional grating coupler 110 experiences a first optical delay $L_1$ 321 from the two-dimensional grating coupler 110 in a first direction along the loop waveguide 120 and a second optical delay $L_2$ 322 from the two-dimensional grating coupler 110 in an opposite direction from the first direction along the loop waveguide 120, where the first optical delay $L_1$ 321 is different from the second optical delay $L_2$ 322.

When light propagating in clockwise direction 321 in the loop waveguide 120 encounters the distributed perturbation, light at the resonant wavelength $\lambda_1$ is reflected and coupled into the output waveguide 340 and propagates in clockwise direction 341. The rest of the light propagating in clockwise direction 321 in the loop waveguide 120 that is not at the resonant wavelength $\lambda_1$ continues propagating in the loop waveguide 120. Similarly, when light propagating in counter-clockwise direction 322 in the loop waveguide 120 encounters the distributed perturbation, light at the resonant wavelength $\lambda_1$ is reflected and coupled into the output waveguide 340 and propagates in counter-clockwise direction 342. The rest of the light propagating in counter-clockwise direction 322 in the loop waveguide 120 that is not at the resonant wavelength $\lambda_1$ continues propagating in the loop waveguide 120.

The photodiode 350 is positioned such that light coupled into the output waveguide 340 and propagating out of a first end 349 of the output waveguide 340 to the photodetector 350 experiences the second optical delay $L_2$ 341 in the output waveguide 340 and experiences the first optical delay L 321 in the loop waveguide 120, and light coupled into the output waveguide 340 and propagating out of a second end 348 of the output waveguide 340 to the photodetector 350 experiences the first optical delay $L_1$ 342 in the output waveguide 340 and experiences the second optical delay $L_2$ 322 in the loop waveguide 340. Thus, light detected by the photodetector 350 arrives after experiencing the same total optical delay independent of the path taken by the light to reach the photodetector 350.

Figure 4:
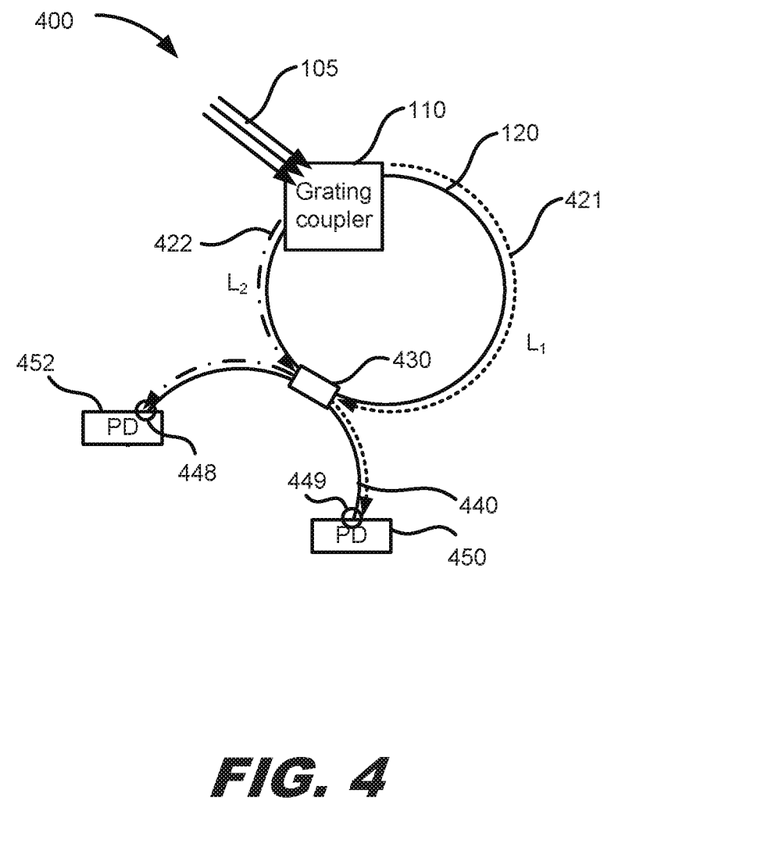
FIG. 4 depicts a diagram of an example receiver system that includes a two-dimensional grating coupler, a loop waveguide, an asymmetrically positioned distributed perturbation and output waveguide, and two photodetectors.

FIG. 4 depicts a diagram of an example receiver system 400 that includes a two-dimensional grating coupler 110, a loop waveguide 120, a coupling region 430, an output waveguide 440, and two photodetectors 450, 452.

The output waveguide 440 is positioned near the loop waveguide 120 in the coupling region 430. A distributed perturbation, such as a Bragg grating, having a resonant wavelength $\lambda_1$ may be in the coupling region 430 to cause coupling of light at the resonant wavelength $\lambda_1$ between the loop waveguide 120 and the output waveguide 440. As shown in the example of FIG. 4, the position of the coupling region 430 may be asymmetrically positioned with respect to the two-dimensional grating coupler 110 such that light impinging on the two-dimensional grating coupler 110 experiences a first optical delay $L_1$ 421 from the two-dimensional grating coupler 110 in a first direction along the loop waveguide 120 and a second optical delay $L_2$ 422 from the two-dimensional grating coupler 110 in an opposite direction from the first direction along the loop waveguide 120, where the first optical delay $L_1$ 421 is different from the second optical delay $L_2$ 422.

Rather than compensating for the difference in optical delay by adjusting the optical delay that the light experiences in the output waveguide 440, as with the example of FIG. 3 described above, two photodetectors 450, 452 may be used. Then the difference in arrival times of the light detected by the first photodetector 450 propagating from a first end 459 of the output waveguide 440 and the light detected by the second photodetector 452 propagating from a second end 458 of the optical waveguide 440 may be compensated for electronically. For example, the difference in arrival times may be compensated using electrical delay lines or digital signal processing.

In some implementations, the coupling region 430 and its distributed perturbation may be positioned symmetrically with respect to the two-dimensional grating coupler 110 such that the light coupled out of the loop waveguide 120 experiences equal optical delays to the two-dimensional grating coupler along both directions of the loop waveguide 120.

The distributed perturbation as used in the coupling region 130, 230, 330, 430 in any of the above examples may be uniform or apodized.

Figure 5:
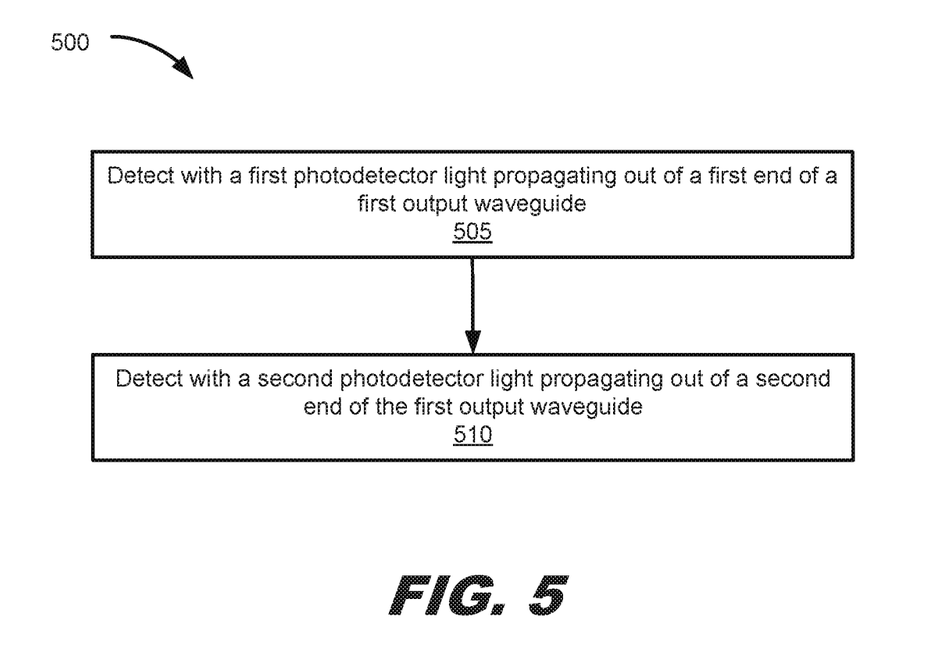
FIG. 5 depicts a flow diagram illustrating an example process of detecting light having orthogonal polarization components.

FIG. 5 depicts a flow diagram illustrating an example process 500 of detecting light having orthogonal polarization components.

The process begins at block 505, where light propagating out of a first end of a first output waveguide may be detected with a first photodetector.

At block 510, light propagating out of a second end of the first output waveguide may be detected with a second photodetector. The first output waveguide is positioned near a loop waveguide at a first coupling region, and a first distributed perturbation having a first resonant wavelength in the first coupling region causes coupling of light at the first resonant wavelength from the loop waveguide to the first output waveguide. Further, a two-dimensional grating coupler is formed on the loop waveguide to couple light impinging on the two-dimensional grating coupler having a first polarization into the loop waveguide in a first direction and to couple light having a second polarization orthogonal to the first polarization into the loop waveguide in a second direction.

In some implementations, the first photodetector is the same as the second photodetector, and the first coupling region is located at a first position along the loop waveguide with equal optical delays to the two-dimensional grating coupler along both directions of the loop waveguide.

In some implementations, the first photodetector is the same as the second photodetector. The first coupling region couples light out of the loop waveguide at a first position along the loop waveguide, wherein the first position is a first optical delay from the two-dimensional grating coupler in a first direction along the loop waveguide and a second optical delay from the two-dimensional grating coupler in an opposite direction from the first direction along the loop waveguide. Further, light propagating out of the first end of the first output waveguide to the first photodetector experiences the second optical delay in the first output waveguide and experiences the first optical delay in the loop waveguide, and light propagating out of the second end of the first output waveguide to the first photodetector experiences the first optical delay in the first output waveguide and experiences the second optical delay in the loop waveguide.

In some implementations, the first photodetector is different from the second photodetector. Additionally, example process 500 for detecting light having orthogonal polarization components may also include electronically compensating for different arrival times in light detected by the first photodetector and light detected by the second photodetector.

Figure 6:
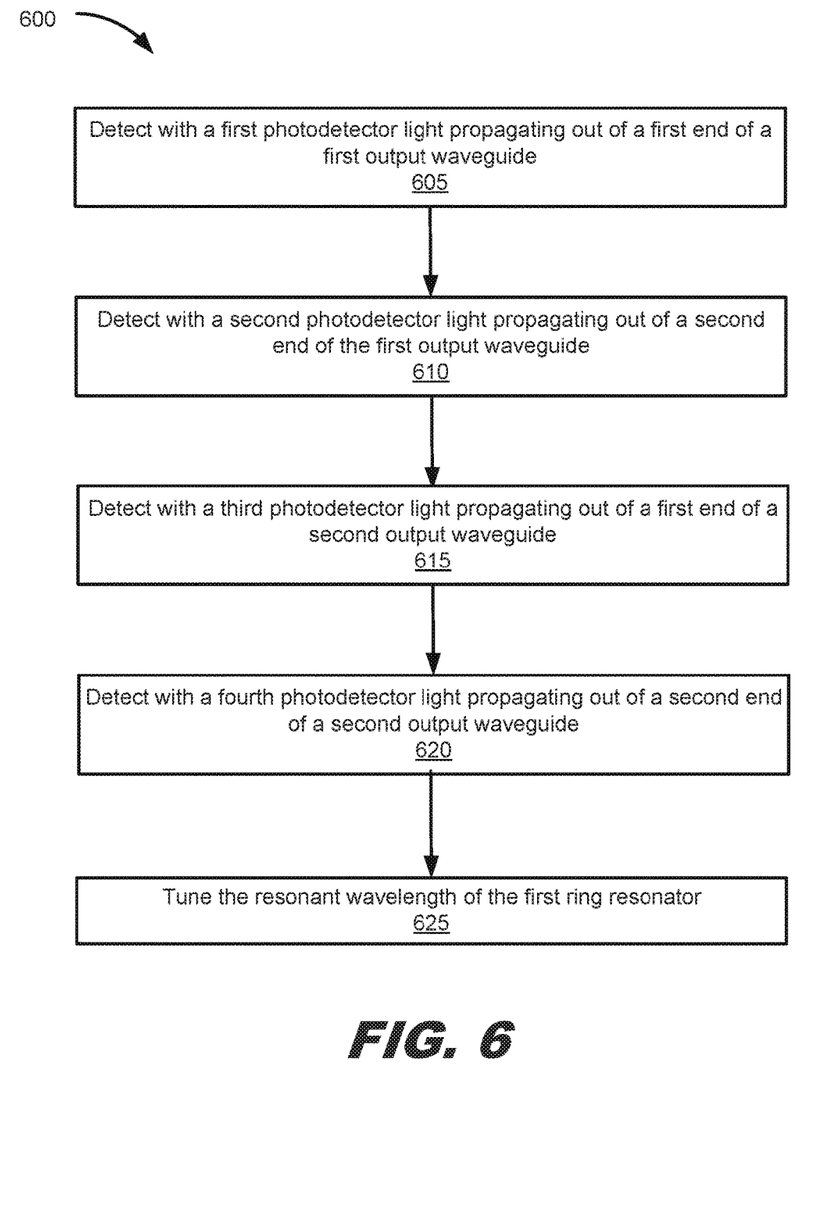
FIG. 6 depicts a flow diagram illustrating another example process of detecting light having orthogonal polarization components.

FIG. 6 depicts a flow diagram illustrating another example process 600 of detecting light having orthogonal polarization components.

The process begins at block 605 which may be similar to block 505 described with respect to process 500 of FIG. 5. Block 610 may also be similar to block 510 of FIG. 5.

At block 615, light propagating out of a first end of a second output waveguide may be detected with a third photodetector.

At block 620, light propagating out of a second end of a second output waveguide may be detected with a fourth photodetector. The second output waveguide is positioned near the loop waveguide at a second coupling region. And a second distributed perturbation having a second resonant wavelength in the second coupling region causes coupling of light at the second resonant wavelength from the loop waveguide to the second output waveguide, and the second resonant wavelength is different from the first resonant wavelength.

At block 625, the resonant wavelength of the first distributed perturbation may be tuned, for example, by injecting carriers or changing the temperature of a portion or all of the distributed perturbation.

Not all of the steps or features presented above are used in each implementation of the presented techniques. Steps may be performed in a different order than presented.

As used in the specification and claims herein, the singular forms "a," "an," and "the" include plural referents unless the context clearly dictates otherwise.

What is claimed is:

1. A polarization diversity receiver system comprising:
a loop waveguide;
a two-dimensional grating coupler formed on the loop waveguide to couple light impinging on the grating coupler having a first polarization into the loop waveguide in a first direction, and to couple light having a second polarization orthogonal to the first polarization into the loop waveguide in a second direction;
a first output waveguide positioned near the loop waveguide in a first coupling region;
a first distributed perturbation having a first resonant wavelength in the first coupling region to cause coupling of light at the first resonant wavelength between the loop waveguide and the first output waveguide; and
a first photodetector to detect light propagating out of a first end and a second end of the first output waveguide.

2. The system of claim 1, further comprising a mechanism to tune a resonant wavelength of the first distributed perturbation.

3. The system of claim 1, wherein the first distributed perturbation is an apodized Bragg grating.

4. The system of claim 1, further comprising:
a second output waveguide positioned near the loop waveguide in a second coupling region;
a second distributed perturbation having a second resonant wavelength, different from the first resonant wavelength, to cause coupling of light at the second resonant wavelength between the loop waveguide and the second output waveguide; and
a second photodetector to detect light propagating out of a first end and a second end of the second output waveguide.

5. The system of claim 1,
wherein the first coupling region is located at a first position along the loop waveguide, wherein the first position is a first optical delay from the two-dimensional grating coupler in a first direction along the loop waveguide and a second optical delay from the two-dimensional grating coupler in an opposite direction from the first direction along the loop waveguide,
wherein light propagating out of the first end of the first output waveguide to the first photodetector experiences the second optical delay in the first output waveguide and experiences the first optical delay in the loop waveguide, and light propagating out of the second end of the first output waveguide to the first photodetector experiences the first optical delay in the first output waveguide and experiences the second optical delay in the loop waveguide.

6. A polarization diversity receiver system comprising:
a loop waveguide;
a two-dimensional grating coupler formed on the loop waveguide to couple light impinging on the grating coupler having a first polarization into the loop waveguide in a first direction, and to couple light having a second polarization orthogonal to the first polarization into the loop waveguide in a second direction;
an output waveguide positioned near the loop waveguide in a coupling region;
a distributed perturbation having a resonant wavelength in the coupling region to cause coupling of light at the resonant wavelength between the loop waveguide and the output waveguide;
a first photodetector to detect light propagating from a first end of the output waveguide; and
a second photodetector to detect light propagating from a second end of the output waveguide, wherein the first photodetector is different from the second photodetector.

7. The system of claim 6, wherein the distributed perturbation couples light out of the loop waveguide at a position along the loop waveguide with equal optical delays to the two-dimensional grating coupler along both directions of the loop waveguide.

8. The system of claim 6,
wherein the coupling region is located at a position along the loop waveguide, wherein the position is a first optical delay from the two-dimensional grating coupler in a first direction along the loop waveguide and a second optical delay from the two-dimensional grating coupler in an opposite direction from the first direction along the loop waveguide,
wherein light propagating out of the first end of the output waveguide to the first photodetector experiences the second optical delay in the output waveguide and experiences the first optical delay in the loop waveguide, and light propagating out of the second end of the output waveguide to the second photodetector experiences the first optical delay in the output waveguide and experiences the second optical delay in the loop waveguide.

9. The system of claim 6, wherein different arrival times in light detected by the first photodetector and light detected by the second photodetector is compensated for electronically.

10. A method comprising:
    detecting with a first photodetector light propagating out of a first end of a first output waveguide; and
    detecting with a second photodetector light propagating out of a second end of the first output waveguide,
    wherein the first output waveguide is positioned near a loop waveguide at a first coupling region,
    wherein a first distributed perturbation having a first resonant wavelength in the first coupling region causes coupling of light at the first resonant wavelength between the loop waveguide and the first output waveguide,
    wherein a two-dimensional grating coupler is formed on the loop waveguide to couple light impinging on the two-dimensional grating coupler having a first polarization into the loop waveguide in a first direction and to couple light having a second polarization orthogonal to the first polarization into the loop waveguide in a second direction.

11. The method of claim 10,
    wherein the first photodetector is the same as the second photodetector, and
    wherein the first coupling region is located at a first position along the loop waveguide with equal optical delays to the two-dimensional grating coupler along both directions of the loop waveguide.

12. The method of claim 10,
    wherein the first photodetector is the same as the second photodetector,
    wherein the first coupling region couples light out of the loop waveguide at a first position along the loop waveguide, wherein the first position is a first optical delay from the two-dimensional grating coupler in a first direction along the loop waveguide and a second optical delay from the two-dimensional grating coupler in an opposite direction from the first direction along the loop waveguide,
    wherein light propagating out of the first end of the first output waveguide to the first photodetector experiences the second optical delay in the first output waveguide and experiences the first optical delay in the loop waveguide, and light propagating out of the second end of the first output waveguide to the first photodetector experiences the first optical delay in the first output waveguide and experiences the second optical delay in the loop waveguide.

13. The method of claim 10,
    wherein the first photodetector is different from the second photodetector,
    the method further comprising:
        electronically compensating for different arrival times in light detected by the first photodetector and light detected by the second photodetector.

14. The method of claim 10, further comprising:
    detecting with a third photodetector light propagating out of a first end of a second output waveguide; and
    detecting with a fourth photodetector light propagating out of a second end of the second output waveguide,
    wherein the second output waveguide is positioned near the loop waveguide at a second coupling region,
    wherein a second distributed perturbation having a second resonant wavelength in the second coupling region causes coupling of light at the second resonant wavelength between the loop waveguide and the second output waveguide, and the second resonant wavelength is different from the first resonant wavelength.

15. The method of claim 10, further comprising:
    tuning the resonant wavelength of the first distributed perturbation.

* * * * *